April 11, 1950 — W. K. McIVER — 2,503,916

POWER TRANSMITTING DEVICE

Filed Sept. 18, 1946

Inventor:
William K. McIver,
by Prowell S. Mack
His Attorney.

Patented Apr. 11, 1950

2,503,916

UNITED STATES PATENT OFFICE 2,503,916

POWER TRANSMITTING DEVICE

William K. McIver, Fort Wayne, Ind., assignor to General Electric Company, a corporation of New York Application September 18, 1946, Serial No. 697,702

5 Claims. (Cl. 172—284)

My invention relates to power transmitting devices and particularly to a dynamoelectric transmission which is adapted to maintain a substantially constant speed on the output side thereof.

An object of my invention is to provide an improved power transmitting device.

Another object of my invention is to provide an improved dynamoelectric power transmitting device adapted to maintain the output speed thereof substantially constant.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
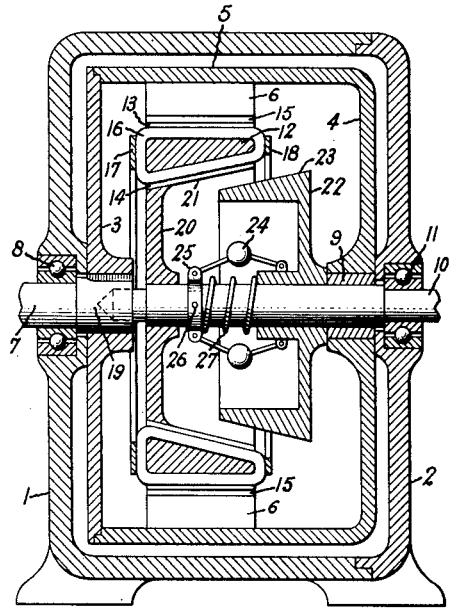
Figure 2:
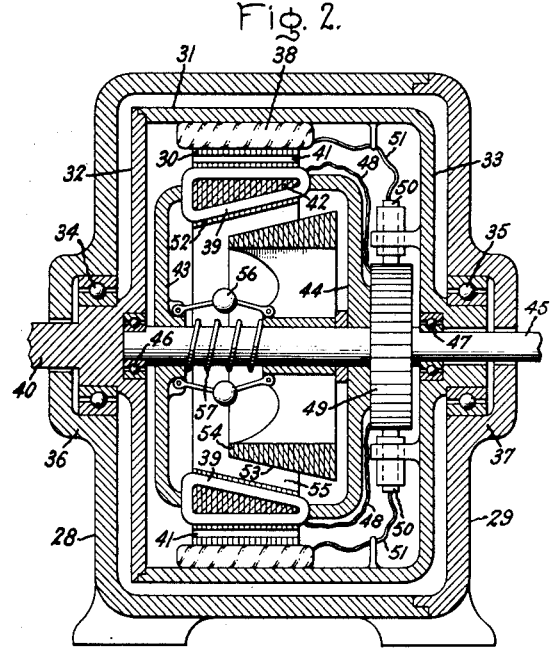

In the drawing, Fig. 1 is a sectional side elevational view of a power transmitting device embodying one adaptation of my invention; Fig. 2 is a sectional side elevational view of another form of my invention; and Fig. 3 is an enlarged end view of the general relative arrangement of the field member, the inductor member, and the shunting core member of a power transmission such as that shown in Figs. 1 and 2.

Figure 3:
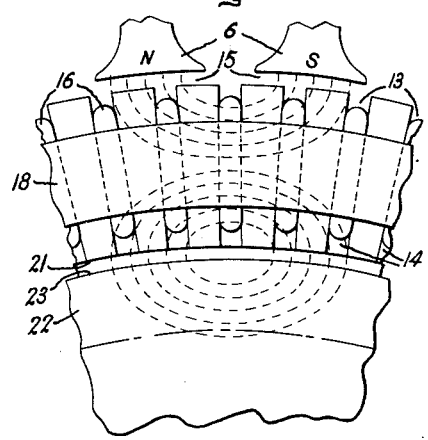

Referring to the drawing, I have shown in Figs. 1 and 3 an embodiment of my improved power transmission in the form of a dynamoelectric power transmitting device which includes a stationary casing formed of two parts 1 and 2 which are suitably held together to form an enclosure for the device and provide bearing housings in each end thereof for supporting the device. In this construction, a rotatable field member is provided which is adapted to set up a suitable magnetic field and which comprises supporting frame members 3 and 4 having an outer portion 5 formed of magnetic material and arranged to support a plurality of circumferentially spaced pole pieces 6. These pole pieces or polar projections 6 may be magnetically excited in any suitable manner, as by a conventional field exciting winding not shown, or by permanent magnets forming such pole pieces or parts thereof or arranged in the magnet frame 5 to provide opposite magnetic polarity to circumferentially spaced adjacent pole pieces 6, as indicated by the dotted flux lines between the two pole pieces 6 in Fig. 3. Torque is adapted to be transmitted through the device by connecting an input source of power to a coupling or shaft extension 7 which is rotatably mounted in bearings 8 in the casing part 1 and which is arranged to be operatively connected to the field member element 3. The other end of the rotatable field member is supported in any suitable manner, as by a journal bearing 9 on an output coupling shaft 10 which is rotatably supported by suitable bearings 11 in the stationary casing member part 2. Torque is adapted to be transmitted from the input shaft 7 to the output shaft 10 through the power transmitting device by the dynamoelectric induction action of the field member upon a rotatable inductor member having a core 12 of suitable magnetic material formed with winding slots 13 and 14 therein in which a suitable winding is arranged to provide the desired electromagnetic inductive relationship between this winding and the rotatable field member. In order to permit the desired relative rotation between the field member and the inductor member, these members are radially spaced by an axially extending substantially constant air gap 15 between the inner periphery of the polar projections 6 and the outer periphery of the core 12. In the construction shown in Figs. 1 and 3, the winding of the inductor member comprises conductors 16 which extend through the winding slots 13 and 14 of the core 12 and are electrically short circuited at each end thereof by end rings 17 and 18 to form a squirrel cage winding. In this construction, one end of the output shaft 10 is rotatably mounted in a hub 19 of the input coupling shaft 7, and the inductor member core 12 is mounted thereon by an operative connection formed by a driving fit, or in any other suitable manner, and is supported by a suitable web 20. In order to maintain the speed of the output shaft 10 substantially constant, an arrangement is provided for varying the reactance of the rotatable member winding and thereby inversely varying the torque transmitted between the field member and the inductor member. In the illustrated arrangement, this is obtained by providing a conical surface 21 on the inner side of the inductor member core 12 and arranging a magnetic shunting core member 22 for movement relative to the inductor member core 12 for varying the magnetic coupling between the winding in the inductor member and the field member. This is obtained by providing an axially movable connection between the magnetic shunting member 22 and the inductor member core 12 and forming this shunting core member with a conical surface 23 on the outer periphery thereof which is complementary to the inductor member core inner surface. In the arrangement shown, the magnetic shunting member is axially movable on the output shaft 10 and axially movable relatively to the inductor core member 12 and is rotatable therewith by being secured thereto through a centrifugal governor mechanism of any suitable design which is shown as including centrifugal members 24 connected to a mounting ring 25 secured in any suitable manner, as by a pin 26 to the output shaft 10 of the inductor member.

In this construction, the magnetic shunting member 22 is biased away from the inductor member core 12 by a suitable compression spring 27 and is adapted to be drawn inwardly to increase the relative surface of the shunting member 22 adjacent the inner surface 21 of the inductor member core 12 and also to decrease the air gap therebetween when the speed of the output connecting shaft 10 and of the inductor member exceeds a predetermined value, thereby increasing the magnetic flux which is shunted through the shunting member 22 and thus increasing the reactance of the rotatable member winding and decreasing the torque transmitted from the field member to the inductor member. Conversely, if the speed of the output connecting shaft 10 decreases below a predetermined value, the force of the spring 27 will predominate over the centrifugal force on the governor members 24, and the shunting core member 22 will move outwardly, thereby decreasing the magnetic shunting surface adjacent the inductor member core 12 and increasing the air gap therebetween, thereby decreasing the reactance of the rotatable inductor member winding and increasing the torque transmitted between the field member and the inductor member. Thus, the simple movement of the shunting member 22 relative to the inductor member core 12 varies the reactance of the rotatable inductor member winding and thereby inversely varies the torque transmitted between the field and inductor members, tending to maintain the speed of the output shaft at a substantially constant value.

In Fig. 2 I have shown another embodiment of my invention in which a power transmission is provided including a dynamoelectric power transmitting device mounted within a stationary casing formed of a pair of complementary members 28 and 29 which are adapted to enclose and support the device. In this construction, the transmission is provided with a rotatable field member having a series of circumferentially spaced apart pole pieces or polar projections 30 which are mounted on a suitable magnet frame 31 supported by end frames 32 and 33 which are rotatably supported by bearings 34 and 35 mounted in bearing housings 36 and 37 formed in the stationary casing members 28 and 29, respectively. The pole pieces 30 and the magnet frame 31 are made of any suitable magnetic material, and in this construction are adapted to be excited magnetically during normal operation by a field exciting winding 38 arranged around the pole pieces 30 and adapted to be energized by electric current supplied thereto from an armature winding 39 arranged in a cooperating inductor member. In this construction, the excitation of the device is provided as in any conventional self-excited generator, as is well known in the art, in which the residual magnetism of the field is adapted to induce a voltage in the armature which in turn is connected across the field exciting winding and thus increases the excitation of the machine, and increases the voltage induced in the armature winding, thereby providing for a desired magnetic excitation. In this construction, torque is adapted to be transmitted from the field member to an inductor member through the power transmitting device and is adapted to be supplied to the device by any suitable input coupling or shaft 40 which is connected to the rotatable field member 32 and is adapted to be connected to an input source of power. The torque is transmitted through an air gap 41 between the inner periphery of the pole pieces 30 and the outer periphery of a core 42 of a rotatable inductor member, which is supported by suitable webs 43 and 44 operatively connected to an output shaft 45 which is rotatably supported by bearings 46 and 47 on the field member end shields 32 and 33. Rotation of the field member around the inductor member winding 39 induces electric currents in this winding which flow through connecting leads 48 to a commutator 49 from which the current is supplied to the field exciting winding 38 through current collectors including brushes 50 which are connected to the field exciting winding 38 through suitable leads 51. As in the construction shown in Figs. 1 and 3, a magnetic shunting member is arranged adjacent the core 42 of the inductor member for varying the reactance of the winding 39 to inversely vary the current flowing through the winding and provide a corresponding variation in the torque transmitted between the field member and the inductor member. In the illustration shown in this figure, the inner surface 52 of the inductor member core 42, is formed at an angle to provide a conical surface, and the outer periphery 53 of a magnetic core member 54 of suitable magnetic material is formed with a complementary conical surface spaced by an air gap 55 from the inner surface 52 of the inductor member core 42. This shunting core member is slidably mounted on the output shaft 43 so as to be axially movable relative to the inductor member core 42 and is rotatable therewith by being connected thereto through a suitable centrifugal mechanism, including centrifugal members 56 which are connected to the inductor member web 43 and to the magnetic shunting core member 54. The magnetic shunting member 54 is biased away from the inductor member core 42 by a suitable compression spring 57 and is adapted to be maintained in its outermost position until the output connecting shaft 43 reaches a predetermined speed, and if this shaft tends to exceed this predetermined speed, the centrifugal members 56 tend to move outwardly and to draw the shunting core member 54 inwardly so as to increase the relative surface adjacent the inductor member core 42 and to decrease the air gap 55 therebetween, thus increasing the reactance of the rotatable inductor member winding and decreasing the torque transmitted between the field member and the inductor member. Conversely, if the speed of the output shaft 43 decreases below a certain value, the centrifugal members 56 move inwardly and the shunting member 54 moves axially outwardly, thereby decreasing the adjacent surface of the shunting member 54 to the inductor member core 42 and increasing the air gap 55 therebetween. This decreases the reactance of the rotatable inductor member winding 39 and thereby increases the torque transmitted between the seal member and the inductor member tending to restore the speed to the desired value. In this manner, the axial movement of the magnetic shunting core member 54 relative to the inductor member core 42 varies the reactance of the inductor member winding and inversely varies the torque transmitted between the input shaft 38 and the output shaft 43 through the dynamoelectric power transmitting device.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A dynamoelectric power transmitting device including a rotatable field member having a field exciting winding thereon, a rotatable inductor member having a core of magnetic material and a winding thereon arranged in electromagnetic inductive relationship to said rotatable field member with an air gap between said rotatable members, a commutator on said inductor member connected to said inductor member winding, current collecting means for providing an electrical connection between said commutator and said field exciting winding, means on one of said rotatable members for connection to an input source of power, means on the other of said rotatable members for providing an output connection for driving a load, and means responsive to the speed of said output connection for varying the reactance of said inductor member winding and inversely varying the torque transmitted between said field member and said inductor member.

2. A dynamoelectric power transmitting device including a stationary casing providing a support for said device, a rotatable field member, a rotatable inductor member having a core of magnetic material and a squirrel cage winding thereon arranged in electromagnetic inductive relationship to said rotatable field member with an air gap between said rotatable members, means on one of said rotatable members for connection to an input source of power, means on the other of said rotatable members for providing an output connection for driving a load, said rotatable inductor member core having a conical inner surface, a magnetic shunting core member having a conical surface complementary to said inductor member core inner surface and mounted for rotation with said rotatable inductor member and axially movable relative thereto with an air gap between said complementary conical surfaces, and means responsive to the speed of said output connection for moving said shunting core member axially of said rotatable inductor member for varying the air gap between said rotatable inductor member and said shunting core member for varying the reactance of said rotatable inductor member winding and inversely varying the torque transmitted between said field member and said inductor member.

3. A dynamoelectric power transmitting device including a stationary casing providing a support for said device, a rotatable field member, a rotatable inductor member having a core of magnetic material and a winding thereon arranged in electromagnetic inductive relationship to said rotatable field member with an air gap between said rotatable members, means on one of said rotatable members for connection to an input source of power, means on the other of said rotatable members for providing an output connection for driving a load, said rotatable inductor member core having a conical inner surface, a magnetic shunting core member having a conical surface complementary to said inductor member core inner surface and mounted for rotation with said rotatable inductor member and axially movable relative thereto with an air gap between said complementary conical surfaces, and means responsive to the speed of said output connection for moving said shunting core member axially of said rotatable inductor member for varying the air gap between said rotatable inductor member and said shunting core member for varying the reactance of said rotatable inductor member winding and inversely varying the torque transmitted between said field member and said inductor member.

4. A dynamoelectric power transmitting device including a stationary casing providing a support for said device, a rotatable field member having a permanent magnet field excitation, a rotatable inductor member having a core of magnetic material and a squirrel cage winding thereon arranged in electromagnetic inductive relationship to said rotatable field member with an air gap between said rotatable members, means on one of said rotatable members for connection to an input source of power, means on the other of said rotatable members for providing an output connection for driving a load, said rotatable inductor member core having a conical inner surface, a magnetic shunting core member having a conical surface complementary to said inductor member core inner surface and mounted for rotation with said rotatable inductor member and axially movable relative thereto with an air gap between said complementary conical surface, and means responsive to the speed of said output connection for moving said shunting core member axially of said rotatable inductor member for varying the air gap between said rotatable inductor member and said shunting core member and inversely varying the torque transmitted between said field member and said inductor member.

5. A dynamoelectric power transmitting device including a stationary casing providing a support for said device, a rotatable field member having a field exciting winding thereon, a rotatable inductor member having a core of magnetic material and a winding thereon arranged in electromagnetic inductive relationship to said rotatable field member with an air gap between said rotatable members, a commutator on said inductor member connected to said inductor member winding, current collecting means for providing an electrical connection between said commutator and said field exciting winding, means on one of said rotatable members for connection to an input source of power, means on the other of said rotatable members for providing an output connection for driving a load, said rotatable inductor member core having a conical inner surface, a magnetic shunting core member having a conical surface complementary to said inductor member core inner surface and mounted for rotation with said rotatable inductor member and axially movable relative thereto with an air gap between said complementary conical surfaces, and means responsive to the speed of said output connection for moving said shunting core member axially of said rotatable inductor member for varying the air gap between said rotatable inductor member and said shunting core member for varying the reactance of said rotatable inductor member winding and inversely varying the torque transmitted between said field member and said inductor member.

WILLIAM K. McIVER.

REFERENCES CITED

The following references are of record in the file of this patent:

UNITED STATES PATENTS

| Number | Name | Date |
|---|---|---|
| 704,574 | Pintsch | July 15, 1902 |
| 1,174,654 | Bergman | Mar. 7, 1916 |
| 2,193,214 | Winther et al. | Mar. 12, 1940 |
| 2,278,507 | Baudry | Apr. 7, 1942 |
| 2,296,776 | Douglas | Sept. 22, 1942 |
| 2,366,562 | Schug | Jan. 2, 1945 |

FOREIGN PATENTS

| Number | Country | Date |
|---|---|---|
| 354,040 | Great Britain | Aug. 6, 1931 |
| 409,821 | Great Britain | May 10, 1934 |
| 544,941 | Great Britain | May 4, 1942 |